(12) United States Patent
Hendry et al.

(10) Patent No.: US 7,019,758 B2
(45) Date of Patent: *Mar. 28, 2006

(54) METHOD AND SYSTEM FOR MAINTAINING FIDELITY OF COLOR CORRECTION INFORMATION WITH DISPLAYS

(75) Inventors: Ian Hendry, San Jose, CA (US); David Hayward, San Francisco, CA (US); John Calhoun, Sunnyvale, CA (US); Eric Anderson, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 10/418,328

(22) Filed: Apr. 16, 2003

(65) Prior Publication Data

US 2004/0004622 A1    Jan. 8, 2004

Related U.S. Application Data

(63) Continuation of application No. 09/443,052, filed on Nov. 18, 1999, now Pat. No. 6,587,116.

(51) Int. Cl.
*G09G 5/02* (2006.01)
(52) U.S. Cl. .................................... 345/600; 345/597
(58) Field of Classification Search ............... 345/589, 345/593, 600, 204, 22, 207; 348/173
See application file for complete search history.

(56) References Cited

U.S. PATENT DOCUMENTS

| | | | |
|---|---|---|---|
| 5,218,671 A | 6/1993 | Liao et al. | |
| 5,483,259 A | 1/1996 | Sachs | |
| 5,512,961 A | 4/1996 | Cappels, Sr. | |
| 5,521,708 A | 5/1996 | Beretta | |
| 5,670,985 A | 9/1997 | Cappels, Sr. et al. | |
| 5,786,803 A | 7/1998 | Hernandez et al. | |
| 5,799,105 A | 8/1998 | Tao | |
| 5,933,646 A | 8/1999 | Hendrickson et al. | |
| 6,037,950 A | 3/2000 | Meir et al. | |
| 6,252,632 B1 | 6/2001 | Cavallaro | |
| 6,504,950 B1 * | 1/2003 | Murashita et al. | 382/162 |
| 6,611,249 B1 * | 8/2003 | Evanicky et al. | 345/102 |

* cited by examiner

*Primary Examiner*—Xiao Wu
*Assistant Examiner*—Kevin M. Nguyen
(74) *Attorney, Agent, or Firm*—Sawyer Law Group LLP

(57) ABSTRACT

Aspects for maintaining and providing a calibrated color environment for display devices of a computer system. In an aspect of an exemplary method, the method includes determining relevant state data, including a framebuffer driver state and a display driver state. The method further includes saving the relevant state data as calibration information for the calibrated color environment. The relevant state data includes information about a display that has an effect on color, such as a frame buffer driver state, a display driver state, and phosphor characteristics of the display.

30 Claims, 2 Drawing Sheets

METHOD AND SYSTEM FOR MAINTAINING FIDELITY OF COLOR CORRECTION INFORMATION WITH DISPLAYS

This is a continuation of Application No. 09/443,052, filed Nov. 18, 1999, now U.S. Pat. No. 6,587,116.

FIELD OF THE INVENTION

The present invention relates to display devices, and more particularly to maintaining fidelity of color correction information with display devices.

BACKGROUND OF THE INVENTION

Current computer systems provide individuals with opportunities to produce documents of professional quality, such as with desktop publishing software and graphics software programs. Input/Output (I/O) devices that support image input or output for production of such documents typically include, for example, monitors, printers, scanners, and digital cameras. Usually, a profile of each such I/O device known to the computer system is stored in the system, e.g., in a system folder, to identify particular characteristics of each device. By way of example, profiles typically include color matching information.

Color matching information includes data, such as red, green, and blue (RGB) values and CMYK (cyan, magenta, yellow, black) values, that are associated with objects and text in the document to control how the objects and text will appear when they are displayed and printed. Because RGB and CMYK values, and more particularly, phosphor characteristics, including gamma correction and white point values, may differ depending on the particular device involved, color matching is offered as a standard component of some operating systems, such as through a system level API (application program interface) that application programs and device drivers of a computer system call.

Utilization of the profiles normally occurs through the system level API. A device profile typically provides a set of characteristics, such as RGB or CMYK values in the document, to describe the device to which the values are associated and enable the document to be portable, i.e., so that it will have the same appearance when rendered on different devices.

When a display device is color calibrated, as by the creation of a profile, various components of hardware and software are configured to achieve the calibration. For example, the display hardware might be adjusted to provide a particular white point, or the framebuffer hardware might be set to drive the video differently by some combination of altering the gamma table and/or altering the signal characteristics of the video output to the display. If the configuration then subsequently changes, it is difficult to recreate a previous color environment due to limited capability of maintaining data for a calibrated color environment. Further, other factors that may affect the color environment of a display, such as environmental factors, including ambient lighting conditions, generally cannot be restored.

Accordingly, a need exists for a reliable manner of maintaining color correction information to support recreation of a calibrated color environment. The present invention addresses such a need.

SUMMARY OF THE INVENTION

The present invention provides aspects for maintaining and providing a calibrated color environment for display devices of a computer system. In an aspect of an exemplary method, the method includes determining relevant state data, including a framebuffer driver state and a display driver state. The method further includes saving the relevant state data as calibration information for the calibrated color environment. The relevant state data includes information about a display that has an effect on color, such as a framebuffer driver state, a display driver state, and phosphor characteristics of the display.

With the present invention, a color calibration state for displays can be fully restored, including restoration of the state of components outside the normal control of a system calibration mechanism. More accurate recreation of a calibrated color environment is achieved efficiently and effectively through the aspects of the present invention. These and other advantages of the aspects of the present invention will be more fully understood in conjunction with the following detailed description and accompanying drawings.

DESCRIPTION OF THE INVENTION

The present invention relates to maintaining color correction information with displays for calibrated color environments. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
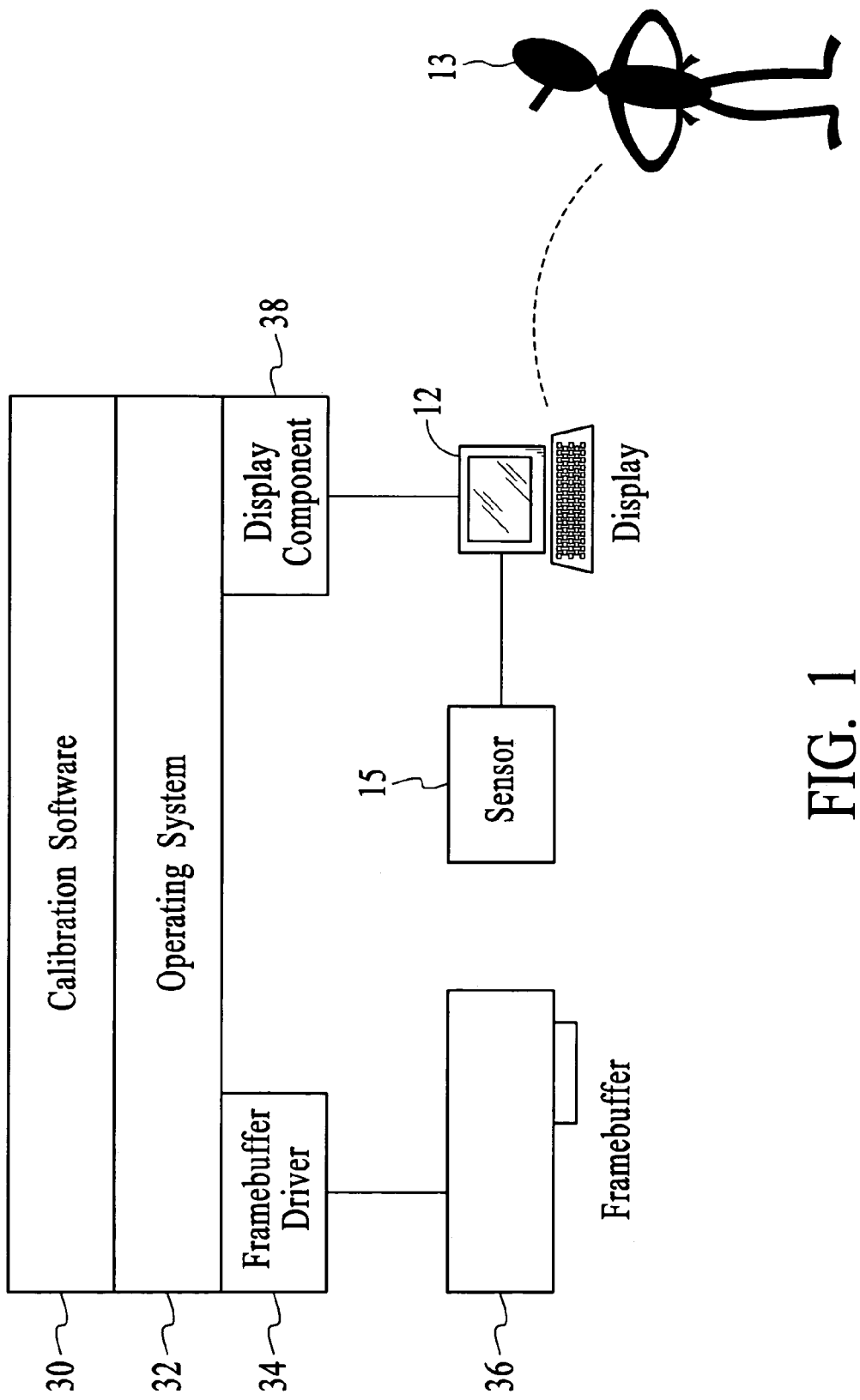
FIG. 1 illustrates a computer system for implementing the present invention.

Implementation of the present invention for maintaining color correction information with displays preferably occurs with a computer processing system, such as a Macintosh computer, available from Apple Computer, Inc., of Cupertino, Calif., that operates via a central processing unit, as is well understood by those skilled in the art. FIG. 1 illustrates portions of a computer system 10 for implementing the present invention. As shown in FIG. 1, a calibrator/calibration software 30 is included and is responsible for adjusting and measuring the color environment to produce a record of the color performance of the display 12 in the current environment. It should be appreciated that although a single display 12 is illustrated, more than one display may be utilized with a computer system 10.

The color environment may be affected by relevant state data from several factors including: user 13 feedback, e.g., in the adjusting of read/write parameters, such as white point values and/or gamma values; an external puck sensor 15, e.g., a device that measures the color coming out of a display screen; and internal electronics, e.g., an ambient light sensor of a display that senses the lighting environment surrounding the computer system 10 during use. Of course, other sensors that affect the color environment of a display may also be included, such as a room temperature sensor and a sensor for detecting a state of window coverings in a room. Further, a control that corrects for a display's color output based on a color blindness condition of a user is another type of factor that, if present in a system, is relevant state data that may affect the color environment. Phosphor decay of a display is another example of a factor affecting the color environment, as is information on the changes in performance of a display over its lifetime, e.g., how the electrodes of the display perform over time. Updates to a system, such as through downloading off of the Internet, that affect the color environment are also preferably included in the calibration information.

The system further includes an operating system 32 that utilizes API calls to support color calibration of the display(s) 12. For example, in a Macintosh computer system, the APIs are primarily color management APIs, e.g., ColorSync APIs, and display manager APIs, as is well appreciated by those skilled in the art. Also included is a framebuffer driver 34 which provides software that acts as an interface to framebuffer hardware 36 for changing and reporting the state of the framebuffer 36. Suitably, a display driver 38 is included as software that acts as an interface to the display hardware for changing and reporting the state of the display(s) 12. For example, in Mac OS, the display driver is referred to as the display component. Preferably, any additional hardware elements that affect the color environment are registered with the operating system 32 through an operating system call, so that the state of the additional hardware elements may be gathered and restored, as needed, when setting and choosing color calibrations, such as when a user manually chooses a new calibration or automatically upon a hardware change occurring, e.g., when a user swaps displays.

Figure 2:
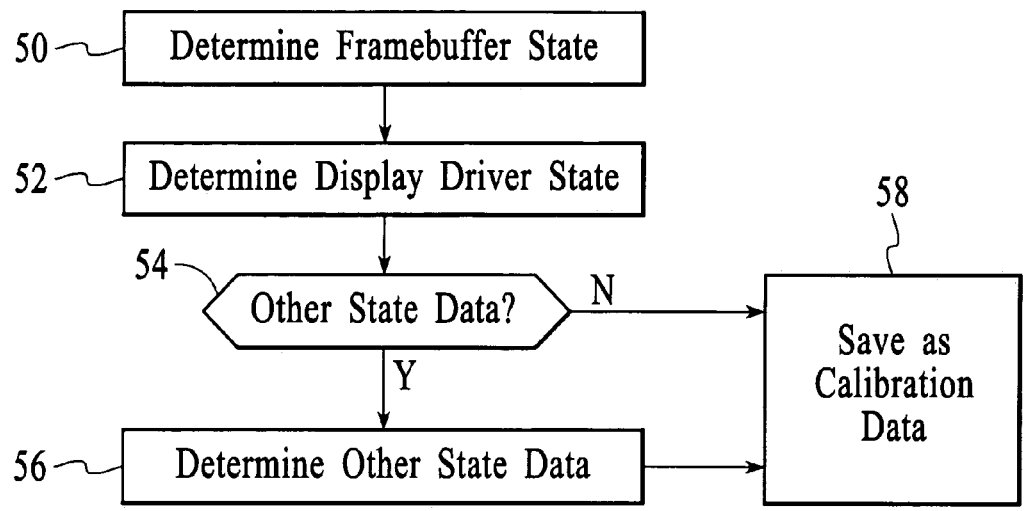
FIG. 2 illustrates a flow diagram for producing calibration data for a calibrated color environment.

To restore color calibrations, as might be contained in profiles, the computer system 10 must have saved those hardware settings that might affect the color environment. FIG. 2 illustrates a block flow diagram of a process for storing color calibration information, including signal characteristics of the framebuffer and display and other relevant state data of the hardware or display environment, in accordance with the present invention. The process occurs by an API call to calibration software 30 (FIG. 1), such as a display manager call to add relevant calibration data to a profile. Thus, the process initiates with a determination of a state of a framebuffer driver 34 (FIG. 1), (step 50). The state of the framebuffer driver 34 includes the signal characteristics of the framebuffer 36 (FIG. 1) that control the gamma, e.g., a gamma value from a gamma table, and analog signals of the video output. A determination of the state of the display driver 38 (FIG. 1) also occurs (step 52). The state of the display driver 38 includes the signal characteristics of the display driver 38 that control a white point of the display(s) 12 (FIG. 1).

A determination for the existence of any other relevant state data follows (step 54), such as by making an API call to the operating system 32 (FIG. 1). The other relevant state data refers to other system elements that are not controlled by the calibration software 30 directly but which could affect the color environment. For example, as mentioned previously, an ambient lighting sensor could be used in the system 10. In order to be included as an element that affects color calibration, preferably the element identifies itself to the operating system 32 through an API call to the operating system 32 when the element is loaded into the system 10. Thus, when other relevant state data does exist (i.e., step 54 is affirmative), the other relevant state data is identified (step 56), such as by the display manager making an API call to each known system element that has presented itself as affecting the color environment. Further, preferably a registration mechanism for third party plug-in products is also included and saves a state of the plug-ins as part of the calibration data. The registration of the plug-ins allows addition of the calibration data without revision of the operating system.

Device drivers for the plug-in register via an operating system API call to indicate their involvement in color calibration. All registered device drivers are called after a display is calibrated to create or update a profile for that calibration and are requested to provide their current state. The current state is stored in the profile for restoration later. Thus, all registered device drivers are called when a profile is applied to a display, i.e., when the color environment is restored, to allow the device driver to restore the color environment. Preferably, the device driver communicates that they are read-only devices, that the stored data is too old to be reliable, or that some other condition prevents restoration of the color environment. Further, should a device driver not be installed on another system, preferably the missing device driver is still supported.

As an example of the registration mechanism, some future development might yield a filter device that simulates phosphor aging and includes an electronically controlled filter that could simulate viewing an image on a display whose phosphors had aged. When a user configures the device to simulate 10 year-old phosphors, the image looks different on a different configuration, unless the configuration had either a 10 year-old display or a device to simulate a 10 year-old display. A device driver or other plug-in for the filter could be registered to the operating system. The registration is suitably performed via an API call and indicates to the system that a device is present that is involved in color correction.

Thus, new hardware features that may not be known to the calibration software 30 may be added to calibration information without requiring alteration of the calibration software 30. The other relevant state data, if any, along with the framebuffer state data determined and the display driver state data determined, is then saved as calibration data (step 58). For example, the calibration data is saved as data tags in a data structure for a profile for the display(s) 12. Through these steps, system elements affecting the color environment are automatically identified within the system and subsequently accessed during calibration, so that their contribution to the color calibration information is included.

Figure 3:
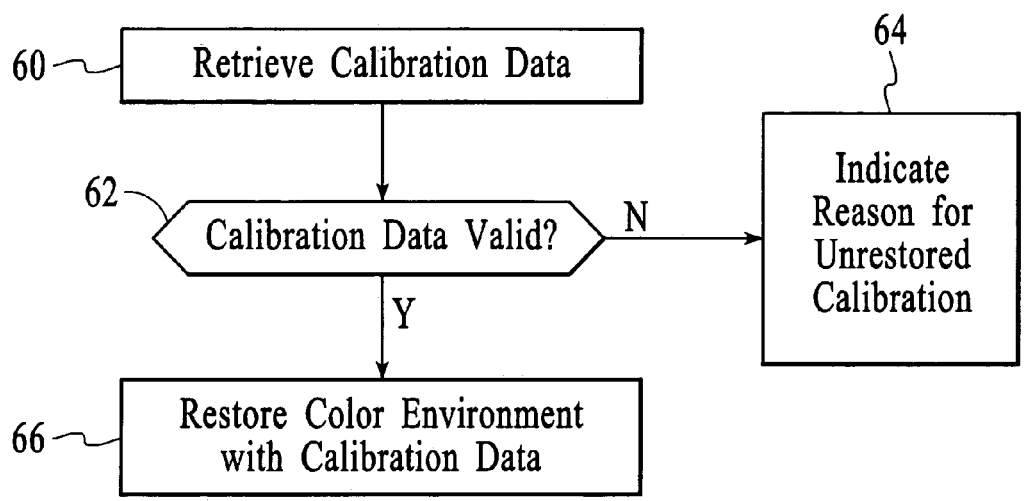
FIG. 3 illustrates a flow diagram for utilizing the calibration data for a calibrated color environment.

When a user wishes to restore a display to a previously calibrated state, the saved calibration data is used, e.g., when an API call to restore the calibration state is made, as described with reference to the flow diagram of FIG. 3. The process initiates with retrieving the calibration data (step 60). For example, the data tags for the calibration information in a selected profile are retrieved. A determination is then made to identify whether the calibration information retrieved is valid (step 62). For example, the calibration data may be invalid for a variety of reasons, such as too much time passing since the original calibration. An amount of time for expiration may be chosen according to design needs and included as data in the profile.

Other errors may indicate missing calibration handlers and problems with read-only types of parameters with an indication of an inability to compensate and/or a range error condition. For example, as mentioned previously, an ambient lighting sensor may be included in the system to provide an ambient light reading. If the system is then used in another lighting situation, such as outside, the ambient light value may be outside the range of the sensor. Thus, an out-of-range error would be indicated. An inability to compensate error may also be indicated, since adjusting the ambient light condition would require compensation external to the system, e.g., moving the system inside.

When invalid calibration data exists, an indication of the failure to restore the calibration and an explanation is provided (step 64), such as through display of a dialog message pop-up box, which may indicate a need to recalibrate. In addition, preferably the calibration data also includes metadata, such as an expiration date for the calibration data, and error estimates/notes as to the relative importance of a given error in the data to provide an explanation to users as to ways of handling the error information.

For valid calibration data, the state of the color environment is restored based on the calibration information retrieved (step 66). Thus, the signal characteristics of the framebuffer driver are restored according to the saved state data, the signal characteristics of the display driver are restored according to the saved state data, along with restoration of any other control information for other elements whose data has been saved. For example, display devices may be capable of having internal settings that control the manner in which the guns for the displays are calibrated. When an external puck sensor had been used to sense these settings during calibration, such settings are restored when calibration is restored.

Although the present invention has been described in accordance with the embodiments shown, one of ordinary skill in the art will readily recognize that there could be variations to the embodiments and those variations would be within the spirit and scope of the present invention. For example, although a particular order for saving and restoring element calibration state data has been described herein, the order is meant as illustrative. Further, the processes of the present invention are capably achieved via a suitable computer readable medium, e.g., hard disks, floppy disk, etc. Also, a preferred embodiment has described use of API calls by the operating system to support color calibration of the display. The support can be application program based instead. Accordingly, many modifications may be made by one of ordinary skill in the art without departing from the spirit and scope of the appended claims.

What is claimed is:

1. A method for providing a calibrated color environment for a display of a computer system, the method comprising:
   determining relevant state data for color calibration, including a framebuffer driver state and a display driver state;
   saving the relevant state data as calibration information for the calibrated color environment; and
   restoring the display to a particular calibration based on the saved calibration information including retrieving the saved calibration information and determining whether the retrieved calibration information is valid wherein,
   if the retrieved calibration information is valid then restoring the display to the particular calibration.

2. The method of claim 1, wherein determining relevant state data for color calibration further comprises providing an operating system call to other system elements affecting the calibrated color environment.

3. The method of claim 2, wherein the other system elements are identified when added to the computer system.

4. The method of claim 1, wherein the relevant state data further comprises data from an ambient light sensor that senses a lighting environment surrounding the computer system.

5. The method of claim 1, wherein the relevant state data further comprises data from an external puck sensor.

6. The method of claim 1, wherein the relevant state data further comprises control data for adjusting color output of the display according to a color blindness compensation control.

7. The method of claim 2, wherein saving the relevant state data further comprises saving the relevant state data as data tags in a display profile.

8. A computer system with calibrated color environment capabilities, the computer system comprising:
   a processor operating in accordance with an operating system;
   a display coupled to the processor for displaying information processed by the processor;
   a calibrator operable to adjust and measure a color environment of the display by determining relevant state data, including a framebuffer driver state and a display driver state, and saving the relevant state data as calibration information for the calibrated color environment, the calibrator further operable to restore the display to a particular calibration based on the saved calibration information by retrieving the saved calibration information and determining whether the retrieved calibration information is valid wherein,
   if the retrieved calibration information is valid then the calibrator is operable to restore the display to the particular calibration.

9. The computer system of claim 8, wherein the operating system utilizes API calls to support color calibration of the display.

10. The computer system of claim 8, wherein the framebuffer driver state identifies signal characteristics for a framebuffer.

11. The computer system of claim 10, wherein the signal characteristics for a framebuffer comprise gamma table values.

12. The computer system of claim 8, wherein the display driver state identifies signal characteristics for the display.

13. The computer system of claim 12, wherein the signal characteristics for the display comprise white point values.

14. The computer system of claim 8, wherein the relevant state data further comprises data for system elements outside direct control of the calibrator.

15. The computer system of claim 14, wherein the system elements comprise an external puck.

16. The computer system of claim 14, wherein the system elements comprise an ambient lighting sensor operable to sense a lighting environment surrounding the computer system.

17. A method for achieving and maintaining a calibrated color environment for a display of a computer system, the method comprising:
   determining calibration information of a color environment for a display including a framebuffer driver state and a display driver state;
   saving the calibration information as data in a profile for the display; and
   restoring the display to a particular calibration based on the saved calibration information in the profile including retrieving the saved calibration information in the profile and determining whether the retrieved calibration information is valid wherein,
   if the retrieved calibration information is valid then restoring the display to the particular calibration.

18. The method of claim 17, wherein determining calibration information further comprises determining a framebuffer driver state and a display driver state, and identifying other relevant state data for color calibration.

19. The method of claim 17, wherein restoring the display to the particular calibration further comprises restoring the signal characteristics of the framebuffer driver, the display driver, and of other control information from the data when the retrieved calibration information is valid.

20. The method of claim 19, further comprising notifying a user when the retrieved calibration information is not valid due to one of the group comprising expiration of the retrieved calibration information, a calibration handler being unavailable, or a control being read only.

21. A computer program product, tangibly stored on an computer-readable medium, for providing a calibrated color environment for a display of a computer system, the product comprising instructions operable to cause a programmable processor to:
   determine relevant state data for color calibration, including a framebuffer driver state and a display driver state;
   save the relevant state data as calibration information for the calibrated color environment; and
   restore the display to a particular calibration based on the saved calibration information including instructions to retrieve the saved calibration information and determine whether the retrieved calibration information is valid wherein,
   if the retrieved calibration information is valid then the display is restored to the particular calibration.

22. The product of claim 21, wherein the instructions to determine relevant state data further includes instructions to provide an operating system call to other system elements affecting the calibrated color environment.

23. The product of claim 22, wherein the other system elements are identified when added to the computer system.

24. The product of claim 21, wherein the relevant state data further comprises data for an ambient light sensor that senses a lighting environment surrounding the computer system.

25. The product of claim 21, wherein the relevant state data further comprises data for an external puck sensor.

26. The product of claim 21, wherein the relevant state data further comprises control data for adjusting color output of the display according to a color blindness compensation control.

27. The product of claim 21, wherein the relevant state data further comprises control data from a plug-in product.

28. The product of claim 22, wherein the instructions to save the relevant state data further comprises instructions to save the relevant state data as data tags in a display profile.

29. The method of claim 1, wherein if the saved calibration information is not valid then indicating a failure to restore the display to the particular calibration.

30. The method of claim 29, wherein indicating a failure to restore the display includes providing an explanation to a user as to ways of handling the failure to restore the display, the explanation having being previously stored with the saved calibration information as metadata.

* * * * *